United States Patent [19]

Murayama

[11] Patent Number: 5,563,787
[45] Date of Patent: Oct. 8, 1996

[54] APPARATUS FOR MEASURING POSITION OF MOVING BODY AND APPARATUS FOR MEASURING RELATIVE DISTANCE

[75] Inventor: Osamu Murayama, Hiratsuka, Japan

[73] Assignee: Kabushiki Kaisha Komatsu Seisakusho, Japan

[21] Appl. No.: 542,412

[22] Filed: Oct. 12, 1995

Related U.S. Application Data

[63] Continuation of Ser. No. 171,836, Dec. 22, 1993, abandoned.

[51] Int. Cl.⁶ .............................. G06F 165/00; G05D 1/02
[52] U.S. Cl. .................................. 364/424.02; 356/5.01; 356/152.3; 180/169; 364/454
[58] Field of Search ........................ 364/424.01, 424.02, 364/449, 453, 454; 318/587; 180/167, 168, 169; 356/5.01, 140, 141.2, 141.4, 152.3

[56] References Cited

U.S. PATENT DOCUMENTS

| | | | |
|---|---|---|---|
| 4,727,492 | 2/1988 | Reeve et al. | 364/424.02 |
| 4,847,769 | 7/1989 | Reeve | 364/424.02 |
| 4,855,915 | 8/1989 | Dallaire | 364/424.02 |
| 5,155,684 | 10/1992 | Burke et al. | 364/424.02 |
| 5,323,152 | 6/1994 | Morita | 340/988 |
| 5,357,432 | 10/1994 | Margolis et al. | 364/424.02 |
| 5,390,118 | 2/1995 | Margolis et al. | 364/424.02 |

FOREIGN PATENT DOCUMENTS 63-311116  12/1988  Japan.

*Primary Examiner*—Michael Zanelli
*Attorney, Agent, or Firm*—Welsh & Katz, Ltd.

[57] ABSTRACT

An apparatus for guiding the traveling of a moving body along a predetermined traveling path with a high degree of accuracy by accurately and reliably determining a corrected position and a corrected traveling direction of the moving body. A moving distance of the moving body between points of reception of light beams is obtained by a counter, and a CPU calculates a corrected position of the moving body by using an angle formed by the projecting directions of the light beams, the position of installation of a reflecting mirror, and an estimated traveling direction obtained on the basis of an output of a rate gyro. A corrected traveling direction is then calculated by using the corrected position thus calculated. The corrected position is calculated by using the traveling direction thus estimatively calculated. Since it is not necessary to directly determine the traveling direction, only two sets of devices for projecting and receiving the light beams are required, and only one device for reflecting the light is required, thereby improving the reliability of the apparatus.

6 Claims, 9 Drawing Sheets

APPARATUS FOR MEASURING POSITION OF MOVING BODY AND APPARATUS FOR MEASURING RELATIVE DISTANCE

This application is a continuation of Ser. No. 08/171,836, filed Dec. 22, 1993, now abandoned.

BACKGROUND OF THE INVENTION

1. Field of the Invention

The present invention relates to an apparatus for measuring the relative distance of a moving body with respect to a mark or the position of the moving member so as to guide the traveling of the moving body along a predetermined traveling path on the basis of the measured results.

2. Description of the Related Art

Conventionally, as a method of guiding the traveling of a moving body along a predetermined traveling path, a guiding method which is generally called a dead-reckoning is known. In this method, the position and traveling direction of the moving body are estimatively calculated on the basis of outputs of a direction detector and a travel length detector, and the steering of the moving body is controlled so as to cause the moving body to pass a predetermined passing point taught in advance on the basis of the estimatively calculated results.

The drawback of this method is that a cumulative error corresponding to a traveled distance occurs in the estimatively calculated result, and a calculation error occurs in the calculation of numerical values, thereby making it impossible for the moving body to pass a predetermined passing point accurately. This is attributable to the fact that in a case where, for instance, an angular velocity sensor is used as the aforementioned direction detector, a cumulative error or a drift error occurs in a detected value when the angular velocity is integrated, or a detection error due to irregularities of a road surface, skidding and the like of wheels occurs in the detected value of the travel length detector.

Accordingly, it has been the general practice to dispose marks at intervals along a predetermined traveling path, and to intermittently correct the estimated position and the estimated traveling direction by recognizing the marks, and various applications for patent have been filed.

As a technique of this type, as disclosed in Japanese Patent Unexamined Publication No. 217787/1986, a method is known in which light-reflecting mirrors are installed at intervals on both sides of a predetermined traveling path, light projecting/receiving devices are provided for projecting light beams from a side of a moving body toward the light-reflecting mirrors and for receiving the light reflected from the light-reflecting mirrors, and the position and traveling direction of the moving body are corrected and calculated on the basis of outputs of the light received by the light projecting/receiving devices, the positions of installation of the light-reflecting mirrors, and so on.

With the conventional techniques, however, it is necessary to provide the moving body with three or more sets of light projecting/receiving devices, and two or more light-reflecting mirrors are required for one correction. When a multiplicity of optical systems are thus provided, the reliability of the apparatus inevitably declines. Accordingly, development of an apparatus capable of effecting correction by using a smaller number of optical systems is desired.

In addition, with regard to the position and traveling direction of the moving body, the positions of installation of the light projecting/receiving devices, the directions of the light projected, the positions of installation of the light-reflecting mirrors, and the like are calculated as known values. Accordingly, in the event that accurate values are not obtained due to the inaccurate survey of the positions of installation of the light-reflecting mirrors or the presence of installation errors at the time of installation, the correction accuracy of the calculated position and traveling direction of the moving body becomes deteriorated. Thus, it is desired to develop an apparatus which is capable of accurately correcting the position and traveling direction of the moving body even when there are errors in the positions of installation of the light projecting/receiving devices and in the directions of the light projected. In addition, since much labor is required in the surveying of the positions of installation of the light-reflecting mirrors, it is desired to alleviate such labor.

As a predetermined traveling path along which a moving body travels, there is a closed loop-type traveling path, and there are cases where the moving body travels along the closed-loop traveling path many times. Here, when the moving body is made to travel along this closed-loop traveling path on the basis of consecutive information on the position and the direction, unless the information on the position and direction of the moving body at a starting point is accurate, the position and direction of the moving body at the same starting point when the moving body has made one circuit deviate substantially from a position and a direction that are desired. Accordingly, it is necessary to cause the moving body to travel accurately by imparting accurate information on the position and direction at the starting point each time the moving body makes one circuit.

In addition, with the light-beam projecting/receiving devices, in a case where the power of the light beam projected is large, there is a problem in safety. At the same time, light reflected from a light-reflecting object other than the light-reflecting mirrors installed is received, so that there is a problem in reliability. If the power of the light beam is conversely made small, it becomes impossible to obtain reflected light at the reflecting mirrors from which the light beam is to be reflected, which presents a problem in reliability. Accordingly, a light beam of a predetermined power is projected, However, in this case as well, portions of the surface of the reflecting mirror may have stains which prevent the reflection. When the light beam is applied to this stained portion, or when the moving body moves irregularly due to rolling, bounding or the like and the light beam is not applied to the reflecting mirror, the reception of the reflected light becomes impossible, thereby presenting a problem in reliability. In addition, the problem of receiving the light reflected from a light-reflecting object other than the relevant reflecting mirror still remains unresolved.

In addition, in a case where the traveling of the moving body is guided along a predetermined traveling path on the basis of the result of measurement of the relative distance of the moving body with respect to a mark, even when the moving body is traveling along a straight line or making a turn in an orbiting manner, it always becomes necessary to determine the relative distance with a high degree of accuracy.

SUMMARY OF THE INVENTION

The present invention has been devised in view of the above-described circumstances, and it is an object of the present invention to provide a position measuring apparatus which is capable of accurately guiding the traveling of a moving body along a predetermined traveling path by precisely and reliably determining the corrected position and the corrected traveling direction of the moving body.

Another object of the present invention is to provide an apparatus which is capable of accurately calculating the relative distance of the moving body with respect to light reflecting means and of accurately guiding the traveling on the basis of this calculated relative distance even if a moving body is turning in an orbiting manner.

To these ends, in accordance with a first aspect of the present invention, there is provided an apparatus for measuring a position of a moving body, which includes moving-distance detecting means for detecting a moving distance of the moving body, traveling-direction detecting means for detecting a traveling direction of the moving body, and estimatively calculating means for estimatively calculating the position and the traveling direction of the moving body on the basis of an output of the traveling-direction detecting means, so as to intermittently correct the estimatively calculated position and traveling direction of the moving body and to control the traveling of the moving body along a predetermined traveling path on the basis of the corrected position and traveling direction, the apparatus comprising:

light projecting means disposed on the moving body, for projecting a first light beam and a second light beam in a lateral direction;

light reflecting means disposed at intervals on one side of the predetermined traveling path of the moving body, for reflecting the first light beam and the second light beam projected by the light projecting means;

light receiving means disposed on the moving body, for receiving the first light beam and the second light beam reflected by the reflecting means;

corrected-position calculating means for determining the moving distance of the moving body from a time when one of the first light beam and the second light beam is received by the light receiving means until the other thereof is received on the basis of an output of the light receiving means and an output of the moving-distance detecting means, and for calculating the corrected position of the moving body on the basis of the moving distance, a position of installation of the light reflecting means, angles of projection of the first light beam and the second light beam, and the traveling direction estimated by the estimatively calculating means;

corrected-traveling-direction calculating means for determining an error in the traveling direction estimated by the estimatively calculating means on the basis of a value calculated by the corrected-position calculating means, a value previously calculated by the corrected-position calculating means, and the position estimated by the estimatively calculating means, and for calculating a corrected traveling direction of the moving body on the basis of the error and the traveling direction estimated by the estimatively calculating means, whereby the moving body is controlled to travel along the predetermined traveling path on the basis of outputs of the corrected-position calculating means and the corrected-traveling-direction calculating means.

In accordance with a second aspect of the present invention, there is provided an apparatus for measuring a position of a moving body, which includes moving-distance detecting means for detecting a moving distance of the moving body, traveling-direction detecting means for detecting a traveling direction of the moving body, and estimatively calculating means for estimatively calculating the position and the traveling direction of the moving body on the basis of an output of the traveling-direction detecting means, so as to intermittently correct the estimatively calculated position and traveling direction of the moving body and to control the traveling of the moving body so that the moving body travels along a predetermined traveling path taught in advance to the moving body, on the basis of the corrected position and traveling direction, the apparatus comprising:

light projecting means disposed on the moving body, for projecting a first light beam and a second light beam in a lateral direction;

light reflecting means disposed at intervals on one side of the predetermined traveling path of the moving body, for reflecting the first light beam and the second light beam projected by the light projecting means;

light receiving means disposed on the moving body, for receiving the first light beam and the second light beam reflected by the reflecting means;

corrected-position calculating means for determining the moving distance of the moving body from a time when one of the first light beam and the second light beam is received by the light receiving means until the other thereof is received on the basis of an output of the light receiving means and an output of the moving-distance detecting means, and for calculating the corrected position of the moving body on the basis of the moving distance, a position of installation of the light reflecting means, angles of projection of the first light beam and the second light beam, and the traveling direction estimated by the estimatively calculating means;

light-reflecting-means-position calculating means for determining the moving distance of the moving body from the time when one of the first light beam and the second light beam is received by the light receiving means until the other thereof is received on the basis of the output of the light receiving means and the output of the moving-distance detecting means, and for calculating a position of installation of the light reflecting means on the basis of the moving distance, angles of projection of the first light beam and the second light beam, and the position and traveling direction estimated by the estimatively calculating means;

corrected-traveling-direction calculating means for determining an error in the traveling direction estimated by the estimatively calculating means on the basis of a value calculated by the corrected-position calculating means, a value previously calculated by the corrected-position calculating means, and the position of the moving body calculated by the estimatively calculating means, and for calculating a corrected traveling direction of the moving body on the basis of the error and the traveling direction estimated by the estimatively calculating means, wherein at the time of teaching the predetermined traveling path the moving body is caused to travel along the predetermined traveling path, the resultant position calculated by the estimatively calculating means is set as a predetermined passing point, and the position of installation of the light reflecting means is detected in advance by the light-reflecting-means-position calculating means, and wherein at the time of causing the moving body to travel along the predetermined traveling path the detected position of installation of the light reflecting means is set as data to be used by the corrected-position calculating means, whereby the traveling of the moving body is controlled on the basis of outputs of the corrected-position calculating means and the corrected-traveling-direction calculating means so that the moving body travels the taught predetermined passing point.

In accordance with a third aspect of the present invention, in the arrangement of the second aspect of the present invention, the predetermined traveling path is a traveling path of a closed loop, wherein at the time of teaching the predetermined traveling path positions of installation of two light reflecting means in a vicinity of a starting point of the predetermined traveling path and the positions of installation of the two light reflecting means at a time when the moving body returns to the starting point after making a circuit along the predetermined traveling path are respectively detected by the light-reflecting-means-position detecting means, and deviations of the position and the traveling direction at a time when the moving body makes a circuit of the predetermined traveling path are calculated on the basis of a result of the detection and the position estimated by the estimatively calculating means when the moving body returns to the starting point after making the circuit, and wherein at the time of causing the moving body to travel along the predetermined traveling path the position and traveling direction of the moving body are corrected on the basis of the calculated deviations each time the moving body passes the starting point.

In accordance with a fourth aspect of the present invention, there is provided an apparatus for measuring the position of a moving body, the apparatus comprising:

estimatively calculating means for estimatively calculating a position and a traveling direction of the moving body;

light projecting means for projecting a light beam from a lateral direction of the moving body, light reflecting means disposed at intervals along a predetermined traveling path of the moving body; and light receiving means disposed on the moving body, for receiving the light reflected by the reflecting means;

wherein the light projecting means is provided with one of means for diffusing the light beam at a predetermined elevating angle and means for scanning the light beam at a predetermined elevating angle; and wherein the position and traveling direction of the moving body calculated by the estimatively calculating means on the basis of an output of the light receiving means are corrected intermittently, and the traveling of the moving body along the predetermined traveling path is controlled on the basis of the corrected position and traveling direction.

In accordance with a fifth aspect of the present invention, there is provided an apparatus for measuring a relative distance of a moving body so as to guide the traveling of the moving body along a predetermined traveling path on the basis of a result of measurement of the relative distance of the moving body with respect to a mark, the apparatus comprising:

moving-distance detecting means for detecting a moving distance of the moving body;

a turning-angle detecting means for detecting a turning angle of the moving body;

light projecting means disposed on the moving body, for projecting a first light beam and a second light beam in a lateral direction;

light reflecting means disposed on one side of the predetermined moving path of the moving body and serving as the mark for reflecting the first light beam and the second light beam;

light receiving means disposed on the moving body, for receiving the first light beam and the second laser beam reflected by the light reflecting means; and relative-distance calculating means for determining the moving distance of the moving body from a time one of the first light beam and the second laser beam is received until the other thereof is received, on the basis of an output of the light receiving means and an output of the moving-distance detecting means, for determining the turning angle of the moving body from the time one of the first light beam and the second laser beam is received until the other thereof is received, on the basis of the output of the light receiving means and the output of the turning-angle detecting means, and for calculating the relative distance of the moving body with respect to the light reflecting means at the point of time when one of the first light beam and the second light beam is received by the light receiving means, on the basis of the moving distance and the turning angle thus determined, the position of installation of the light reflecting means, and angles of projection of the first light beam and the second light beam.

In accordance with a sixth aspect of the present invention, there is provided an apparatus for measuring a position of a moving body so as to guide the traveling of the moving body along a predetermined traveling path on the basis of a result of measurement of the position of the moving body, the apparatus comprising:

moving-distance detecting means for detecting a moving distance of the moving body;

moving-direction detecting means for detecting a moving direction of the moving body;

light projecting means disposed on the moving body, for projecting a first light beam and a second light beam in a lateral direction;

light reflecting means disposed on one side of the predetermined moving path of the moving body, for reflecting the first light beam and the second light beam;

light receiving means disposed on the moving body, for receiving the first light beam and the second laser beam reflected by the light reflecting means; and relative-distance calculating means for determining the moving distance of the moving body from a time one of the first light beam and the second laser beam is received until the other thereof is received, on the basis of an output of the light receiving means and an output of the moving-distance detecting means, for determining a turning angle of the moving body from the time one of the first light beam and the second laser beam is received until the other thereof is received, on the basis of the output of the light receiving means and the output of the moving-direction detecting means, and for calculating the relative distance of the moving body with respect to the light reflecting means at the point of time when one of the first light beam and the second light beam is received by the light receiving means, on the basis of the moving distance and the turning angle thus determined, the position of installation of the light reflecting means, angles of projection of the first light beam and the second light beam, and the moving direction detected by the moving-direction detecting means.

In accordance with the above-described first aspect of the present invention, the corrected-position calculating means calculates the corrected position of the moving body on the basis of the moving distance between points of time of reception of the first and the second light beams, angles of projection of the first and second light beams, the position of installation of the light reflecting means, and the estimated traveling direction calculated by the estimatively calculating means. The corrected-traveling-direction calculating means calculates a corrected traveling direction by using the corrected position calculated by the corrected-position calculating means. The corrected position is calculated by using the traveling direction thus estimatively calculated, and since it is not necessary to directly determine the traveling direction, only two sets of devices for projecting and receiving the light beams are required, and only one device for reflecting the light is required, thereby improving the reliability of the apparatus.

In accordance with the above-described second aspect of the present invention, the estimated position calculated at the time of teaching is set as a predetermined passing point, and during the guided traveling the traveling of the moving body is controlled in such a manner as to pass the predetermined passing point. Here, since the same distance detecting means and traveling-direction detecting means are used at the time of teaching and the guided traveling, errors of these detecting means are offset from each other. In addition, the same light reflecting means, light projecting means, light receiving means, and the like are used in the light-reflecting-means-position calculating means for calculating the position of the light reflecting means during teaching and in the corrected-position calculating means for calculating the corrected position of the moving body during the guided traveling, errors in the calculation of the position of the light reflecting means, errors in the projecting directions of the light beams, and the like are offset during teaching and the guided traveling. Consequently, the moving body is caused to travel along the predetermined traveling path with a high degree of accuracy. Moreover, the moving body can be taught by being only moved along the predetermined traveling path, and there is no need to survey the passing points of the predetermined traveling path and the positions of the light reflecting means, thereby substantially alleviating the labor.

In accordance with the above-described third aspect of the present invention, deviations of the position and the direction at a starting point and at the same starting point at a time when the moving body makes one circuit are calculated during teaching. Since the position and the direction are corrected by the aforementioned deviations at the starting point each time the moving body makes a circuit, the guided traveling during a next circuit can be effected with a high degree of accuracy without accumulation of the deviations.

In accordance with the above-described fourth aspect of the present invention, even if portions of the light reflecting means are stained, the light is reflected by other portions, and even if the moving body moves irregularly, the light beam is applied reliably onto the light reflecting means. In particular, when the light beam is diffused, the farther the beam reaches, the smaller the power becomes. Hence, the light beam is prevented from being reflected from a distant object, thereby further improving the reliability.

In accordance with the above-described fifth aspect of the present invention, the moving distance of the moving body from a time one of the first light beam and the second laser beam is received until the other thereof is received is determined on the basis of an output of the light receiving means and an output of the moving-distance detecting means. Meanwhile, the turning angle of the moving body from the time one of the first light beam and the second laser beam is received until the other thereof is received is determined on the basis of the output of the light receiving means and the output of the turning-angle detecting means. Then, the relative distance of the moving body with respect to the light reflecting means at the point of time when one of the first light beam and the second light beam is received by the light receiving means is calculated on the basis of the moving distance and the turning angle thus determined, the position of installation of the light reflecting means, and angles of projection of the first light beam and the second light beam. The traveling of the moving body is guided along the predetermined traveling path on the basis of the thus-calculated relative distance of the moving body with respect to the mark.

In accordance with the above-described sixth aspect of the present invention, the moving distance of the moving body from a time one of the first light beam and the second laser beam is received until the other thereof is received is determined on the basis of an output of the light receiving means and an output of the moving-distance detecting means. Meanwhile, the turning angle of the moving body from the time one of the first light beam and the second laser beam is received until the other thereof is received is determined on the basis of the output of the light receiving means and the output of the moving-direction detecting means. Then, the relative distance of the moving body with respect to the light reflecting means at the point of time when one of the first light beam and the second light beam is received by the light receiving means is calculated on the basis of the moving distance and the turning angle thus determined, the position of installation of the light reflecting means, angles of projection of the first light beam and the second light beam, and the moving direction detected by the moving-direction detecting means. The traveling of the moving body is guided along the predetermined traveling path on the basis of the position of the moving body thus calculated.

It should be noted that other objects, features and advantages of the present invention will become more apparent from the following detailed description of the invention when read in conjunction with the accompanying drawings.

DESCRIPTION OF THE PREFERRED EMBODIMENTS

Referring now to the accompanying drawings, a description will be given of the preferred embodiments of an apparatus for measuring a position of a moving body and an apparatus for measuring a relative distance in accordance with the present invention.

Figure 1:
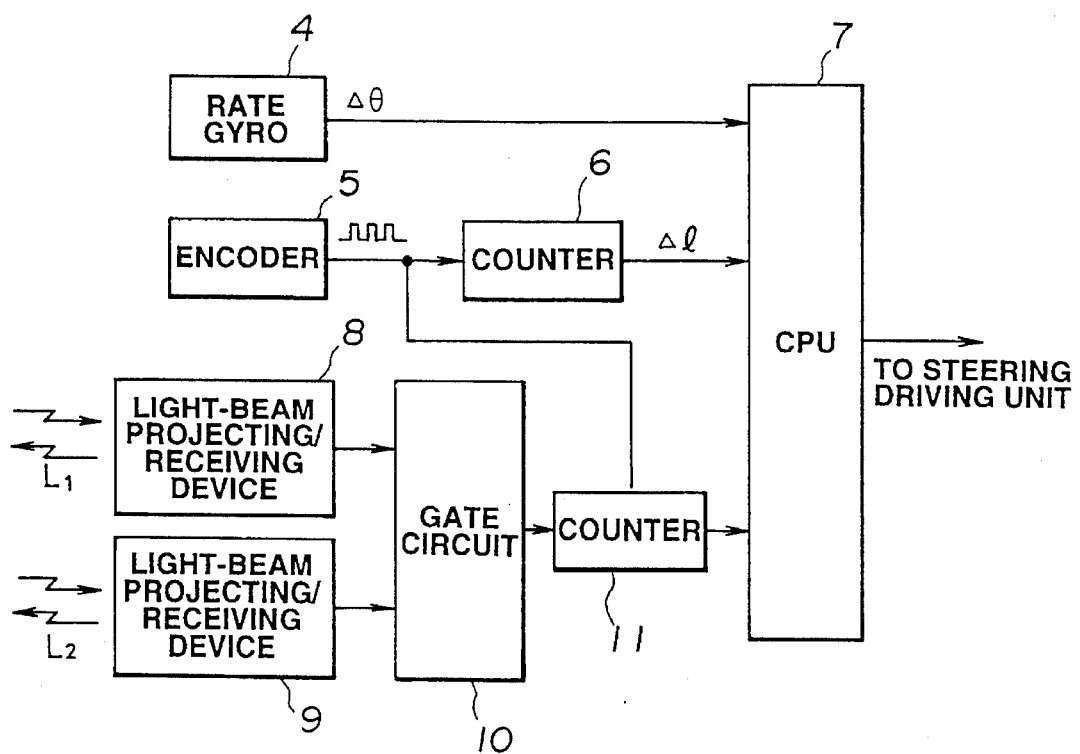
FIG. 1 is a block diagram illustrating a configuration of an embodiment of an apparatus for measuring the position of a moving body in accordance with the present invention.
Figure 4:
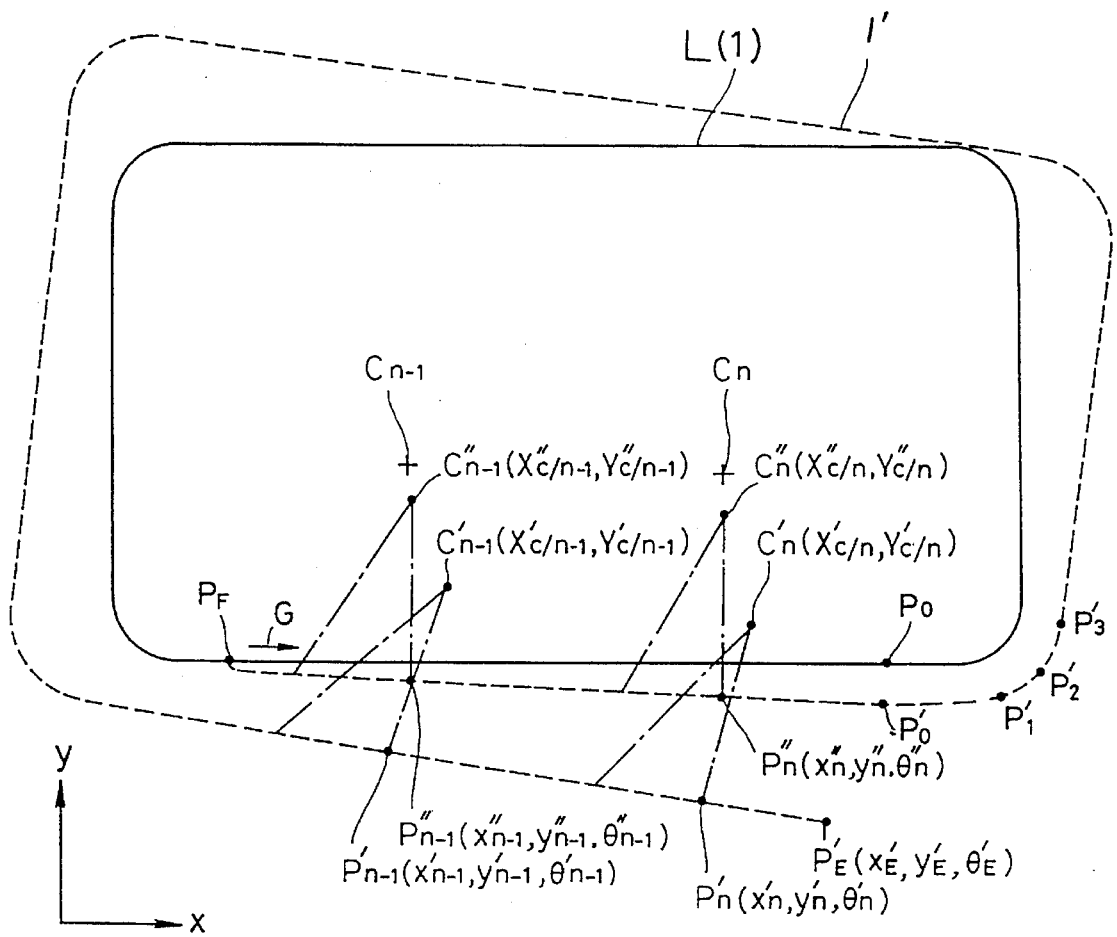
FIG. 4 is a diagram illustrating a predetermined traveling path in accordance with the embodiment for explaining the calculation of a deviation between a starting point and a terminating point in a closed-loop traveling path.
Figure 5:
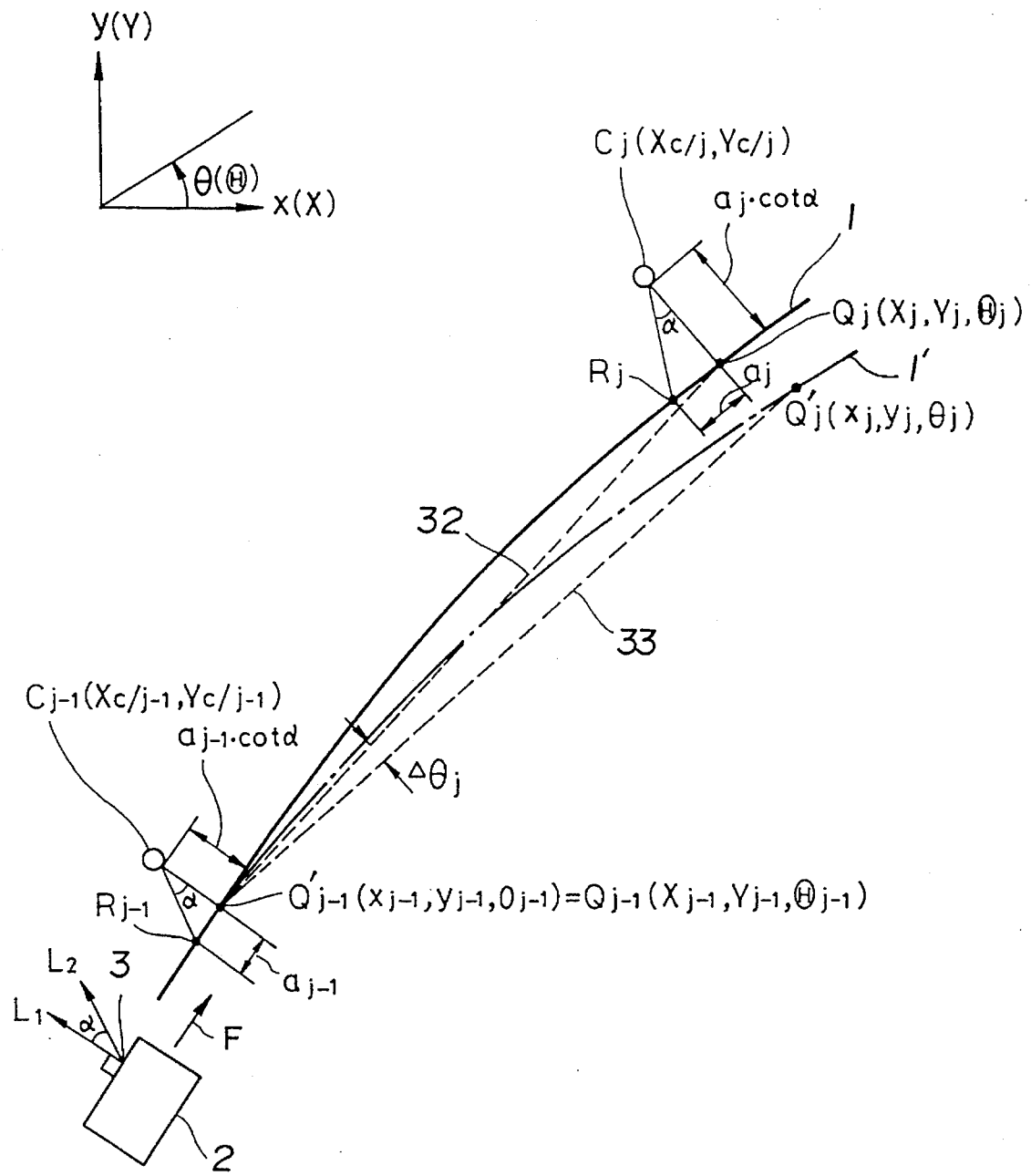
FIG. 5, is a diagram illustrating the manner in which the moving body travels, and explains the correction calculation of the position and the direction.

FIG. 1 is a block diagram illustrating a configuration of the apparatus in accordance with an embodiment, and it is assumed that this apparatus is mounted on a moving body 2 shown in FIG. 5. The moving body 2 is, for instance, an unmanned dump truck, and a case is assumed in which the moving body 2 travels along a predetermined traveling path L of a closed loop shown in FIG. 4.

A rate gyro 4 shown in FIG. 1 is provided to detect the traveling direction of the moving body 2, as required, and outputs an amount of change in the traveling direction, $\Delta\theta$, per unit time to a CPU 7. Meanwhile, a pulse encoder 5 is provided on an unillustrated wheel of the moving body 2 so as to detect the number of revolutions of the wheel. The encoder 5 outputs the number of pulses corresponding to the amount of rotation of the wheel, and applies the same to a counter 6. The counter 6 counts that number of pulses, outputs a moving distance (travel length) $\Delta l$ per unit time of the moving body 2, and applies the same to the CPU 7. The outputs $\Delta\theta$ and $\Delta l$ of the rate gyro 4 and the counter 6 are used in the estimative calculation of the position and direction of the moving body 2 in accordance with a dead reckoning, as will be described later.

Light-beam projecting/receiving devices 8 and 9 are respectively disposed on a left-hand position 3 with respect to an advancing direction F of the moving body 2, as shown in FIG. 5. Of these devices, the light-beam projecting/receiving device 8 projects a laser beam $L_1$ leftward perpendicular to the longitudinal direction of a vehicle. At the same time, the light-beam projecting/receiving device 8 receives the light $L_1$ reflected from reflecting mirrors $C_1, C_2$, ..., $C_{j-1}, C_j, ..., C_{n-1}, C_n$ which are provided at intervals on the left-hand side of a predetermined traveling path 1 of the moving body 2 along the traveling path 1, and applies signals representative of the received light to a gate circuit 10. Similarly, the light-beam projecting/receiving device 9 projects a laser beam $L_2$ in a direction inclined toward the front side of the vehicle at an angle $\alpha$ with respect to the direction of projection of the laser beam $L_1$. At the same time, the light-beam projecting/receiving device 9 receives the light $L_2$ reflected from the reflecting mirrors $C_1, ...,$ and applies signals representative of the received light to the gate circuit 10. It should be noted that it is assumed that the reflecting mirrors $C_1, ...$ have the function of reflecting the received light beam in the same direction as the direction of incidence.

Here, the light reception signals which are inputted to the gate circuit 10 are used in the corrective calculation of the position and direction of the moving body 2, as will be described later. Accordingly, in the event that the moving body 2 has moved irregularly and the laser beams $L_1$ and $L_2$ have deviated from the light-receiving surfaces of the reflecting mirrors $C_1, ...,$ or the laser beams $L_1$ and $L_2$ are applied to stained portions of the surfaces of the reflecting mirrors $C_1, ...,$ it becomes impossible to obtain the aforementioned light reception signals. Hence, the corrective calculation of the relevant position and direction cannot be conducted.

Figure 7:
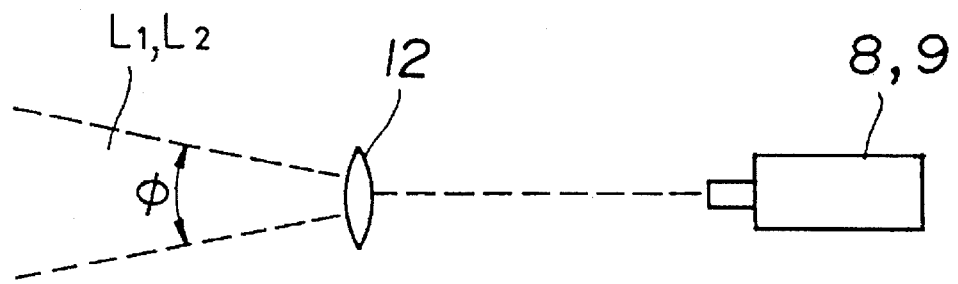
FIGS. 7(a) and 7(b) are diagrams illustrating specific arrangements of light-beam projecting/receiving devices shown in FIG. 1.
Figure 7:
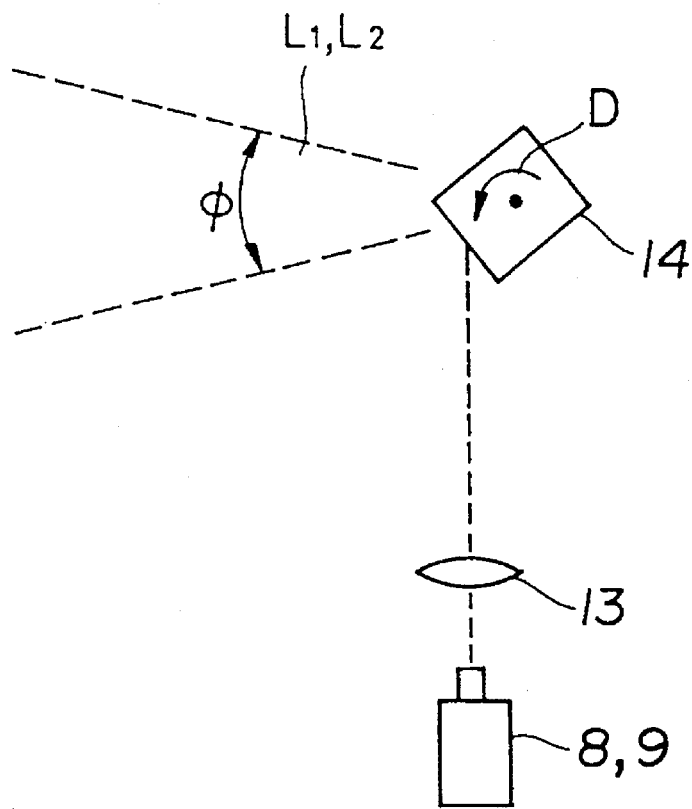

Accordingly, in this embodiment, in order to reliably obtain the reflected light, devices are provided for expanding the range of projection of the laser beams $L_1$ and $L_2$ in a vertically expanding direction, as shown in FIGS. 7(a) and 7(b). In the device shown in FIG. 7(a), the laser beams $L_1$ and $L_2$ made emergent from laser beam sources of the light-beam projecting/receiving devices 8 and 9 are expanded via a cylindrical lens 12, and are diffused at an angle $\phi$ in an elevating direction. Meanwhile, in the device shown in FIG. 7(b), the laser beams $L_1$ and $L_2$ made emergent from the laser beam sources of the light-beam projecting/receiving devices 8 and 9 are applied to a side surface of a polygon mirror 14 via a lens 13. For this reason, the laser beams $L_1$ and $L_2$ are made to scan at the angle $\phi$ in the elevating direction in correspondence with the rotation D of the polygon mirror 14. By virtue of such devices, the reflected light can be obtained reliably, and the corrective calculation can be effected reliably. In particular, according to the beam expanding technique shown in FIG. 7(a), the farther the beam reaches, the smaller the power of the light per unit area becomes, so that it is possible to prevent a situation in which the laser beams $L_1$ and $L_2$ are received by being reflected by another light-reflecting object located farther than the reflecting mirrors $C_1, ...,$ thereby making it possible to further improve the reliability of the light reception signals.

The gate circuit 10 is constituted by a flip-flop or the like, and outputs to a counter 11 a signal instructing a start of counting by the counter 11 when the light reception signal is applied to the gate circuit 10 from the light-beam projecting/receiving device 9. At the same time, the gate circuit 10 outputs to the counter 11 a signal instructing an end of counting by the counter 11 when the light reception signal is applied to the gate circuit 10 from the light-beam projecting/receiving device 8. Pulse signals outputted from the encoder 5 are applied to the counter 11. Accordingly, the counter 11 outputs a signal representative of a distance by which the moving body 2 has moved from the time when the reflected light $L_2$ was received until the reflected light $L_1$ is received, and this signal is inputted to the CPU 7.

Here, referring to FIG. 6 as well, a description will be given of the basic principle of the calculation of the position and direction of the moving body 2 in accordance with the dead reckoning. It should be noted that the small letters x, y, and $\theta$ indicate calculated values based on the dead reckoning, while the capital letters X, Y, and $\Theta$ indicate calculated values based on corrective calculation which will be described later.

Figure 6:
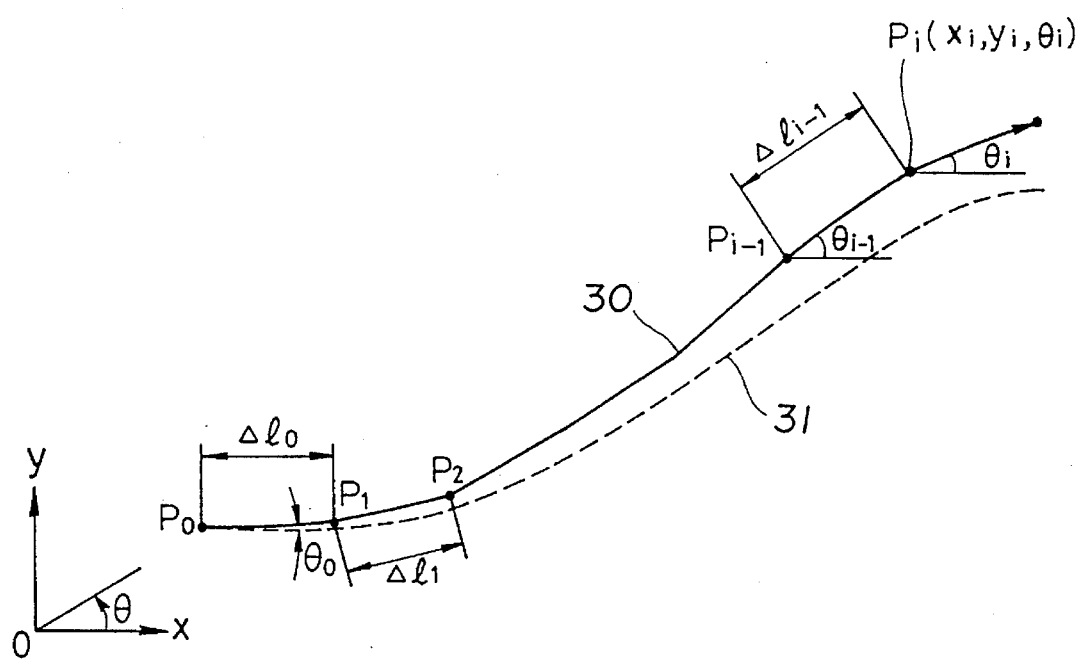
FIG. 6 is a diagram used for explaining the estimative calculation of the position and direction based on a dead reckoning.

When the moving body 2 starts traveling from a preset initial position $P_0$ ($x_0$, $y_0$) as shown in FIG. 6, the counter 6 consecutively outputs travel lengths $\Delta l_0, \Delta l_1, ...$ for each unit time. Meanwhile, if the initial attitude angle of the moving body 2 is $\theta_0$, the gyro 4 consecutively outputs amounts of angular change $\Delta\theta_0, \Delta\theta_1, ...$ for each unit time. Consequently, the position and a traveling direction ($x_i$, $y_i$, $\theta_i$) of the moving body 2 at a given point $P_i$ (i=1, 2, 3, ...) are calculated as shown in Formulae (1) to (3) below.

$$x_i = x_0 + \sum_{k=0}^{i-1} \Delta l_k \cdot \cos((\theta_k + \theta_{k+1})/2) \quad (1)$$

$$y_i = y_0 + \sum_{k=0}^{i-1} \Delta l_k \cdot \sin((\theta_k + \theta_{k+1})/2) \quad (2)$$

$$\theta_i = \theta_0 + \sum_{k=0}^{i-1} \Delta\theta_k \quad (3)$$

The solid line 30 shown in FIG. 6 shows the traveling locus of the moving body 2 in which the position and direction obtained from Formulae (1) to (3) above are plotted with the lapse of time, while the broken line 31 shows the traveling locus of the moving body 2 in which the actual position and direction of the moving body 2 are plotted. As is apparent from FIG. 6, it can be seen that the calculated values based on the dead reckoning comes to deviate substantially from the actual position and direction as the moving body 2 continues to travel a long distance.

The cause of the occurrence of such a cumulative error is attributable to the fact that detection errors due to the gyro 4 and the encoder 5 are included in the calculated values in Formulae (1) to (3) above, and that calculation errors due to canceling in the integral calculation are included.

Next, a description will be given of the basic principle of calculation processing for intermittently correcting the position and direction including such errors. FIG. 5 is a diagram for explaining such corrective calculation. It is now assumed that the positions of installation of the reflecting mirrors $C_1$, . . . shown in FIG. 5 are already known through measurement conducted in advance by surveying or the like, or through the installation of the reflecting mirrors at known positions.

The moving body 2 advances as shown at the locus 1, and each time the moving body 2 passes by each of the reflecting mirrors $C_1$, . . . , the following calculation is performed. It should be noted that numeral 1' indicated by the dot-dash line in FIG. 5 denotes a locus in which calculated values based on the aforementioned dead reckoning are plotted, while numeral 1 indicated by the solid line denotes the actual locus of the moving body 2.

Namely, when the moving body 2 passes a vicinity of the reflecting mirror $C_j$ at a position $(X_{cij}, Y_{cij})$, first at a point of time when the position 3 where the light-beam projecting/receiving devices 8 and 9 are disposed reaches a position $R_j$, the light $L_2$ projected from the light-beam projecting/receiving device 9 is reflected by the reflecting mirror $C_j$, and the reflected light $L_2$ is received by the light-beam projecting/receiving device 9. Then, at a point of time when the position 3 reaches a position $Q_j$, the light $L_1$ projected similarly from the light-beam projecting/receiving device 8 is similarly reflected, and the reflected light $L_1$ is received by the light-beam projecting/receiving device 8. As a result, the counter 11 measures a moving distance $a_j$ between the two points $R_j$ and $Q_j$.

For this reason, as is evident from geometric relationships, if it is assumed that the traveling direction of the moving body 2 at the position $Q_j$ is $\Theta$, the corrected position $Q_j (X_j, Y_j)$ of the moving body 2 is obtained from the following Formulae (4) and (5) on the basis of the aforementioned distance data $a_j$ and the position $(X_{cij}, Y_{cij})$ of the reflecting mirror $C_j$:

$$X_j = X_{cij} + a_j \cot \alpha \cdot \sin \Theta_j \quad (4)$$

$$Y_j = Y_{cij} - a_j \cot \alpha \cdot \cos \Theta_j \quad (5)$$

Even if a correct value $\Theta_j$ of the traveling direction is unknown, since the error of the measured value $\Theta_j$ at a corresponding position $Q'_j$, which is obtained by calculation in accordance with the dead reckoning, is small, and the distance between the reflecting mirror $C_j$ and the position $Q_j$ is not large, the formulae (4) and (5) can be approximated as shown in the following Formulae (6) and (7) by using an estimatively calculated value $\theta_j$ instead of $\Theta_j$:

$$X_j = X_{cij} + a_j \cot \alpha \cdot \sin \theta_j \quad (6)$$

$$Y_j = Y_{cij} - a_j \cot \alpha \cdot \cos \theta_j \quad (7)$$

Furthermore, if the corrected position $Q_j$ of the moving body 2 is calculated in accordance with the dead reckoning as described above, from this corrected position $Q_j$ and a corrected position $Q_{j-1}$ at the time of passing by a vicinity of the previous reflecting mirror $C_{j-1}$, an error $\Delta\theta_j$ of the estimatively calculated value $\theta_j$ of the traveling direction is obtained as shown in the following Formula (8):

$$\Delta\theta_j = \text{angle } Q_j \, Q_{j-1} \, Q'_j \quad (8)$$

Accordingly, the corrected value $\Theta_j$ of the traveling direction is obtained by the following Formula (9):

$$\Theta_j = \theta_j + \Delta\theta_j \quad (9)$$

In addition, a scale factor $K_1$ of the encoder 5 is corrected by the following Formula (10) on the basis of $K'_1$ which was used up until then:

$$K_1 = K'_1 \cdot Q_j Q_{j-1} / (Q'_j Q_{j-1}) \quad (10)$$

As described above, the calculation error of the traveling direction $\theta_j$ of the moving body 2 has a large effect on the calculation based on the dead reckoning shown in Formulae (1) to (3). However, since its effect on the corrective calculation shown in Formulae (4) and (5) is small, even if the estimatively calculated value $\theta_j$ which includes errors as shown in Formulae (6) and (7) is used, the position can be measured with a high degree of accuracy, and the traveling direction can be measured with a high degree of accuracy from Formula (9) on the basis of this position. Here, since, in such a corrective calculation, it is not necessary to detect the correct traveling direction $\Theta_j$ directly from the outputs of the light-beam projecting/receiving devices as in the conventional manner, the number of the light-beam projecting/receiving devices can be reduced to 2, while the number of the reflecting mirrors can be reduced to 1. For this reason, the number of times when the light is received is reduced, so that the reliability of the apparatus improves. In addition, as for the reflecting mirrors, it is not necessary for the reflecting mirrors to be installed on both sides of the traveling path, so that the restriction of the installation site can be reduced.

The CPU 7 performs the estimative calculations (1) to (3) and corrective calculations (6) to (10) based on the above-described dead reckoning, outputs a steering angle command for traveling along the predetermined traveling path 1 to an unillustrated steering drive unit, so as to control the driving of the steering wheels of the moving body 2.

The moving body 2 is taught in advance a predetermined traveling path L, and is guided and caused to travel along this taught predetermined traveling path L. As the method of teaching this predetermined traveling path L, it is generally conceivable to 1) survey the respective points which constitute the predetermined passing points on the predetermined traveling path L, but in this embodiment, an arrangement is provided such that 2) the calculated values (Formulae (1), (2), and (3)) based on the dead reckoning and obtained when the moving body 2 is actually made to travel along the predetermined traveling path L are stored as the predetermined passing points.

In addition, in the calculation of the corrected position in accordance with Formulae (6) and (7) above, a description has been given on the assumption that 3) the positions of the reflecting mirrors $C_1$, . . . determined in advance by surveying or the like are used.

In this embodiment, however, 4) the positions of the reflecting mirrors $C_1$, . . . are determined in advance at the time of teaching in accordance with the following Formulae (11) and (12) obtained by rewriting Formulae (6) and (7) above, and these values are used in the calculation (Formulae (6) and (7)) of the corrected position for automatic traveling.

Furthermore, in this embodiment, it is assumed that the closed-loop traveling path L (FIG. 4) is used, as described above, and the following procedure is taken:

5) At the time of teaching, deviations of the position and direction which occur when the moving body 2 makes one circuit and returns to the same starting point of the closed-loop path after starting from that starting point are calculated in advance. Then, each time the moving body 2 passes that starting point during automatic traveling, the position and direction are corrected by the aforementioned deviations.

It should be noted that, as another embodiment, if the closed-loop traveling path is not used, the aforementioned item 5) may be omitted. In addition, instead of the above items 2) and 4), it is possible to implement the above items 1) and 3).

Figure 2:
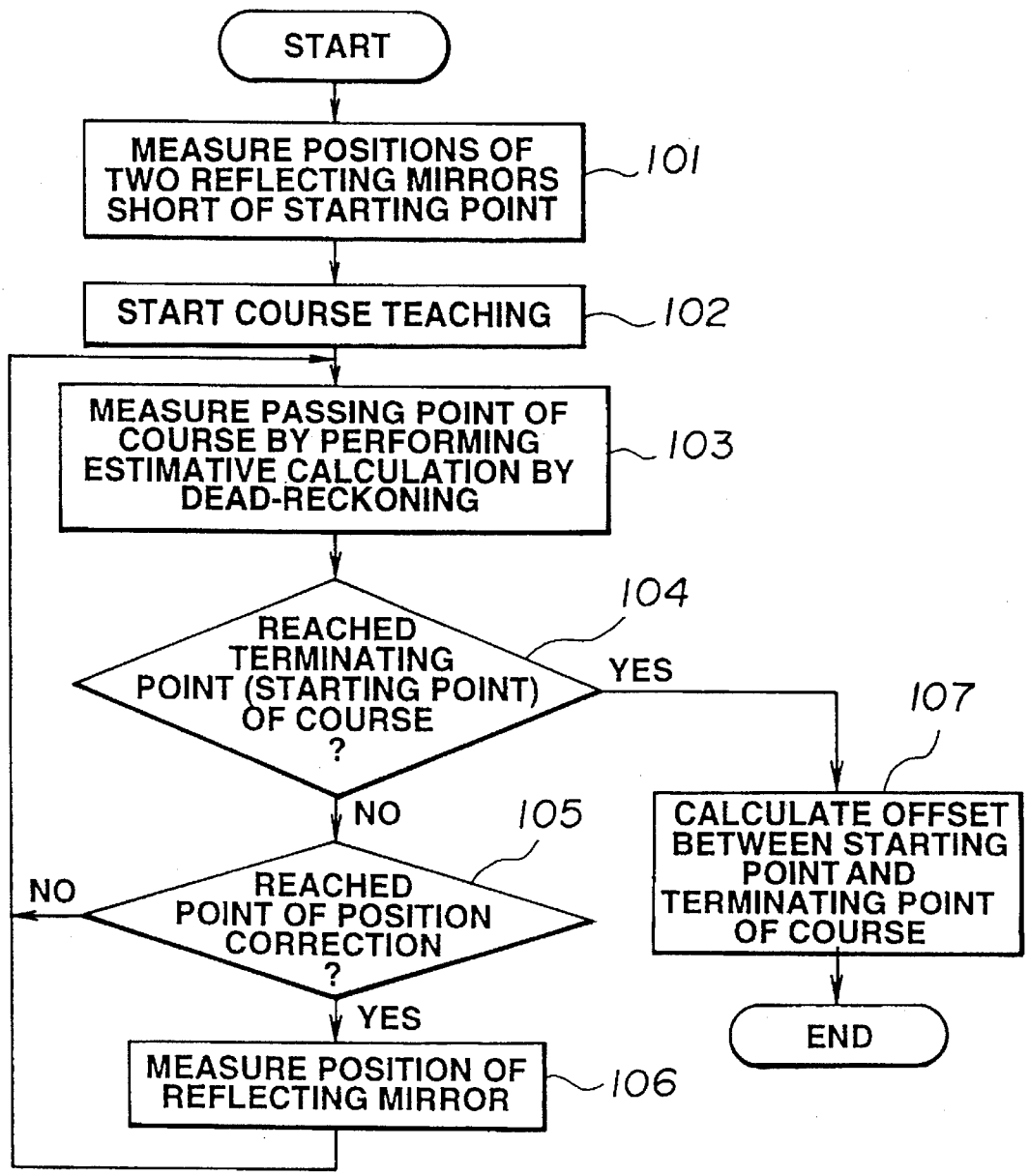
FIG. 2 is a flowchart illustrating a processing procedure of the embodiment.
Figure 3:
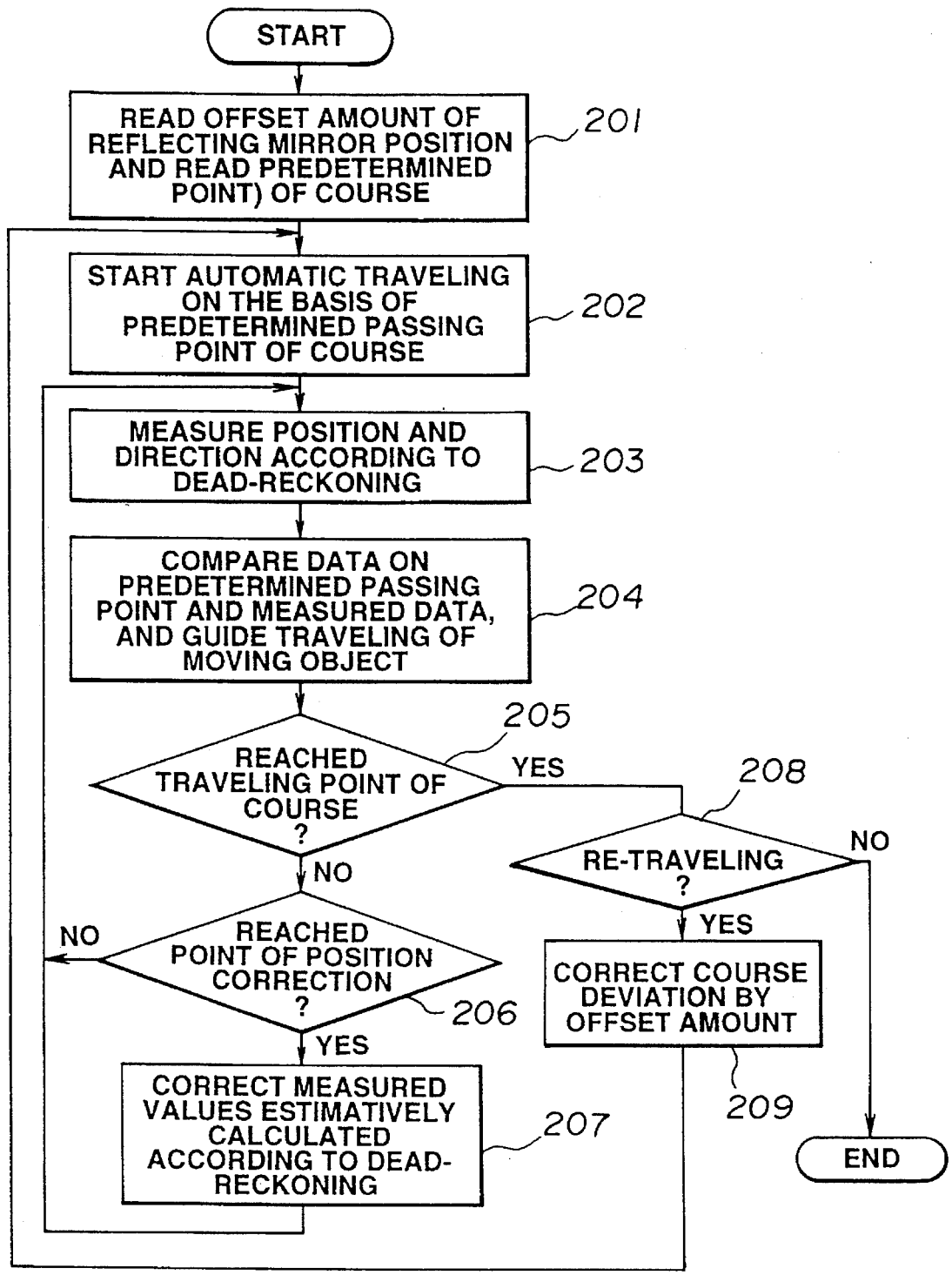
FIG. 3 is a flowchart illustrating a processing procedure of the embodiment.

Referring now to FIGS. 2 and 3 as well, a description will be given of processing performed by the CPU 7.

♦ At the time of teaching

First, as shown in FIG. 4, the moving body 2 is made to start traveling in the direction of arrow G from a point $P_F$ immediately before the starting point $P_0$, and is caused to travel along the predetermined traveling path L. It should be noted that, in FIG. 4, reference numeral 1 denotes a locus along which the moving body 2 actually travels; 1' denotes a locus in which values calculated in accordance with the estimative calculation (Formulae (1) and (2)) are plotted; and $C_{n-1}$ and $C_n$ represent an actual position of the reflecting mirror located at a second reflecting mirror short of the starting point $P_0$ and an actual position of a first reflecting mirror short of the starting point $P_0$, respectively.

Then, at a point of time when the moving body 2 reaches a point $P''_{n-1}$, the position and direction are obtained from the estimative calculation as ($x''_{n-1}$, $y''_{n-1}$, and $\theta_{n-1}$). On the basis of this, a position $C''_{n-1}$ ($X''_{c/n-1}$, $Y''_{c/n-1}$) of the reflecting mirror $C_{n-1}$ is calculated in accordance with the following Formulae (11) and (12):

$$X''_{c/n-1} = x''_{n-1} - a_{n-1} \cdot \cot \alpha \cdot \sin \theta''_{n-1} \quad (11)$$

$$Y''_{c/n-1} = y''_{n-1} + a_{n-1} \cdot \cot \alpha \cdot \cos \theta''_{n-1} \quad (12)$$

The above Formulae (11) and (12) are obtained by rewriting Formulae (6) and (7), and are determined with respect to the position of the reflecting mirror. Then, at a point of time when the moving body 2 reaches a point $P_n$, a position $C''_n$ ($X''_{c/n}$, $Y''_{c/n}$) of the reflecting mirror $C_n$ is calculated in the same way as in the above Formulae (11) and (12) (Step 101).

Then, after the moving body 2 reaches the starting point $P_0$, estimated positions $P'_1$, $P'_2$, $P'_3$, . . . are consecutively determined in accordance with Formulae (1) and (2) of estimative calculation, and they are set as targeted passing points of the predetermined traveling path L and are consecutively stored in an unillustrated memory of the CPU 7 (Steps 102 and 103).

During traveling, a determination is made as to whether or not the moving body 2 has made one circuit of the predetermined traveling path L and returned to the starting point (Step 104). If the result of the determination is NO, the operation proceeds to an ensuing Step 105, and a determination is made as to whether or not the moving body 2 has reached a point of position correction, i.e., a point for which the corrective calculation (Formulae (6) and (7)) based on outputs of the received light reflected by the reflecting mirror is to be performed (Step 105). If the result of the determination is NO, the operation returns again to Step 103. Meanwhile, if the result of the determination is YES, in an ensuing Step 106, positions $C'_1$, $C'_2$, . . . of the reflecting mirrors $C_1$, $C_2$, . . . are consecutively calculated on the basis of the outputs of the light reception by the light-beam projecting/receiving devices 8 and 9 in the same way as in Formulae (11) and (12) above, and the operation returns again to Step 103. In due course of time, when the moving body 2 reaches again a point of position correction by the reflecting mirror $C_{n-1}$, a position $C'_{n-1}$ ($X'_{c/n-1}$, $Y'_{c/n-1}$) of the reflecting mirror $C_{n-1}$ is calculated on the basis of an estimatively calculated value $P'_{n-1}$ ($x'_{n-1}$, $Y'_{n-1}$, $\theta'_{n-1}$) existing at that time. At the same time, when the moving body 2 reaches again a point of position correction by the reflecting mirror $C_n$, a position $C'_n$ ($X'_{c/n}$, $Y'_{c/n}$) of the reflecting mirror $C_n$ is calculated on the basis of an estimatively calculated value $P'_n$ ($x'_n$, $y'_n$, $\theta'_n$) existing at that time (Step 106).

At a point of time when a determination is made in Step 104 that the moving body 2 has reached the starting point $P_0$, i.e., a terminating point, the operation proceeds to Step 107. Here, the position of the starting point $P_0$ in the estimative calculation is set as $P'_E$ ($x'_E$, $y'_E$, $\theta'_E$).

In Step 107, on the basis of the positions $C''_{n-1}$ ($X''_{c/n-1}$, $Y''_{c/n-1}$) and $C''_n$ ($X''_{c/n}$, $Y''_{c/n}$) of the two reflecting mirrors short of the starting point before the start of teaching, which were calculated in Step 101, the positions $C'_{n-1}$ ($X'_{c/n-1}$, $Y'_{c/n-1}$) and $C'_n$ ($X'_{c/n}$, $Y'_{c/n}$) of those two reflecting mirrors short of the starting point, which were calculated in Step 106, and the position of the starting point $P'_E$ ($x'_E$, $y'_E$, $\theta'_E$) at the time when one circuit is made, which was obtained in Step 103, positional deviations $\Delta x$, $\Delta y$, and a directional deviation $\Delta \theta$ due to errors in the estimative calculation between the starting point and terminating point taught in accordance with the estimative calculation are obtained from the following Formulae (13) to (15):

$$\Delta\theta = \arctan((Y''_{c/n} - Y''_{c/n-1})/(X''_{c/n} - X''_{c/n-1}) - \arctan((Y'_{c/n} - Y'_{c/n-1})/(X'_{c/n} - X'_{c/n-1}) \quad (13)$$

$$\Delta x = (X''_{c/n} - X'_{c/n}) + (X'_E - X'_{c/n})\cos\Delta\theta - (Y'_E - Y'_{c/n})\sin\Delta\theta - (X'_E - X'_{c/n}) \quad (14)$$

$$\Delta y = (Y''_{c/n} - Y'_{c/n}) + (X'_E - X'_{c/n})\sin\Delta\theta - (Y'_E - Y'_{c/n})\cos\Delta\theta - (Y'_E - Y'_{c/n}) \quad (15)$$

Here, the first term in Formula (13) indicates an inclination of a segment connecting the two points $C''_{n-1}$ and $C''_n$, and the second term indicates an inclination of a segment connecting the two points $C'_{n-1}$ and $C'_n$. In addition, the first terms in Formulae (14) and (15) indicate portions of relative deviation in the twice-measured position of the final reflecting mirror $C_n$, and the second and subsequent terms indicate cumulative errors in the calculation of the direction $\theta$ due to the gyro 4 as well as portions of deviation which occur due to the distance between the measured position of the final reflecting mirror $C_n$ and the terminating point $P'_E$. Accordingly, when the distance between the reflecting mirror $C_n$ and the starting point $P_0$ is small, the second and subsequent terms may be omitted.

It should be noted that in a case where the cumulative error in the calculation of the direction $\theta$ is negligible, the calculation of Formula (13) above can be omitted. In this case, it suffices if only the position of either one of the reflecting mirrors $C_{n-1}$ and $C_n$ is measured prior to the start of teaching and upon completion of teaching.

The offsets (deviations) $\Delta\theta$, $\Delta x$, and $\Delta y$ obtained as described above are stored in the unillustrated memory (Step 107).

♦ At the time of automatic traveling:

In a case where the moving body 2 is caused to travel automatically on the basis of the above-described taught data $P'_1$, $P'_2$, . . . , the positions of the reflecting mirrors $C'_1$, $C'_2$, . . . , $C'_{n-1}$, $C'_n$ and the amounts of offset $\Delta\theta$, $\Delta x$, and $\Delta y$, which are calculated as described above, are read from the memory, and the predetermined passing points $P'_1, P'_2, \ldots$ are read (Step 201). By using these passing points as the consecutive targeted points, the steering of the moving body 2 is controlled (Step 202).

During traveling, the estimative calculation (Formulae (1) to (3)) is performed (Step 203), and each time the moving body 2 reaches the point of position correction (i.e., the result of determination in Step 206 is YES), the corrective calculation (Formulae (6), (7) and (9)) of calculated values in the estimative calculation is performed. Then, the steering is controlled such that the moving body 2 passes the predetermined passing points $P'_1, P'_2, \ldots$ in the above-described manner on the basis of the data on the measured position and direction.

Here, the corrective calculation of the position X, Y in Formulae (6) and (7) is conducted by using the positions $C'_1, C'_2, \ldots, C'_{n-1}, C'_n$ of the reflecting mirrors read in Step 201 (Step 204).

In due course of time, when a determination is made that the moving body 2 has returned to the terminating point, i.e., the moving body 2 has returned to the original starting point after making one circuit (the result of the determination in Step 205 is YES), a determination is made as to whether or not the moving body 2 is to be caused to travel again from the starting point (Step 208). If the result of the determination is YES, the amounts of offset $\Delta x$, $\Delta y$, and $\Delta \theta$ read in Step 201 are added to the position x, y, and $\theta$ measured at the terminating point so as to correct the error in the estimative calculation (Step 209). If re-traveling is not carried out (the result of the determination in Step 208 is NO), the processing ends.

As described above, in accordance with this embodiment, the estimated positions $P'_1, P'_2, \ldots$ measured during teaching are set as the predetermined passing points, and during automatic traveling the traveling of the moving body 2 is controlled in such a manner as to pass the predetermined passing points. Here, since the same gyro 4 and encoder 5 are used during teaching and during automatic traveling, the error is reproducible, so that the detection errors of the sensors are offset. In addition, outputs and the like of light reception by using the same reflecting mirrors $C_1, C_2, \ldots$ and light-beam projecting/receiving devices 8 and 9 are obtained in the positions $C'_1, C'_2, \ldots$ of the reflecting mirrors calculated during teaching (calculations (11) and (12)) and in the corrected positions X and Y of the moving body 2 calculated during automatic traveling (calculations (6) and (7)). Therefore, the errors at the time of installation of the reflecting mirrors, the errors in the projecting direction of the light beams, and the like are offset during teaching and automatic traveling. Consequently, the moving body 2 is caused to travel along the predetermined traveling path L with a high degree of accuracy. Further, it is possible to obtain advantages that labor is not required in the surveying and the like of the passing points and the positions of the reflecting mirrors, that a targeted course can be measured simply by moving the moving body 2 during teaching, and that a locus commensurate with the moving capacity of the moving body 2 can be set since the moving body 2 is actually moved.

Furthermore, with the measuring apparatus using the dead reckoning, if the movement of the moving body is three-dimensional as in the case of moving on, for example, an undulating terrain, it has been necessary to add a sensor for measuring the moving direction in the three dimensions in an inertial navigation method, for example, and to effect coordinate transformation in correspondence with the moving direction of the moving body in order to obtain coordination between a targeted locus based on surveying and calculated values during automatic traveling. However, as in this embodiment, in the case where calculated values obtained by the measurement of the same system during teaching and automatic traveling, the measurements are reproducible even in the two dimensions, so that the moving body can be guided with a high degree of accuracy even if the moving body actually moves in the three dimensions.

In addition, in accordance with this embodiment, the deviations $\Delta x$, $\Delta y$, and $\Delta \theta$ in the position and direction at the starting point and at the same starting point after one circuit are calculated during teaching. These deviations are reproducible. Accordingly, by correcting the position and direction by the aforementioned amounts at the starting point each time the moving body 2 makes one circuit, the traveling during a next circuit is guided with a high degree of accuracy without the accumulation of the deviations. It should be noted that, in this embodiment, the aforementioned deviations are determined from the positions of two reflecting mirrors short of the starting point, it is possible to determine the deviations on the basis of the positions of two reflecting mirrors immediately beyond the starting point. In other words, it suffices if the deviations are determined on the basis of reflecting mirrors in the vicinity of the starting point, so that these reflecting mirrors may be those located immediately before and after the starting point.

Figure 8A:
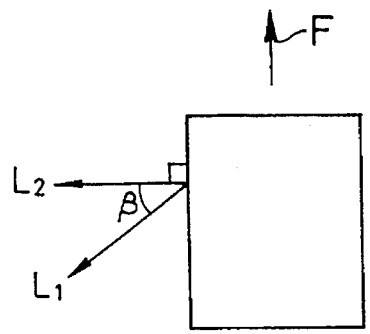
FIGS. 8(a), 8(b), 8(c), and 8(d) are diagrams illustrating directions of projection by the light-beam projecting/receiving devices.
Figure 8B:
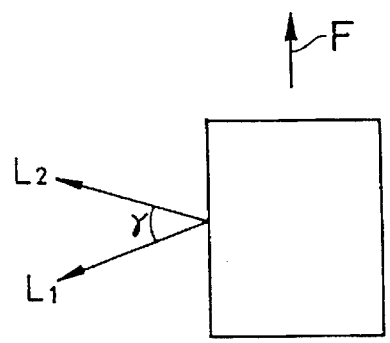
Figure 8C:
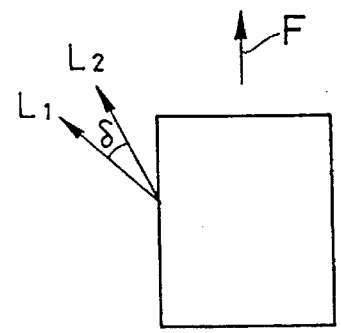
Figure 8D:
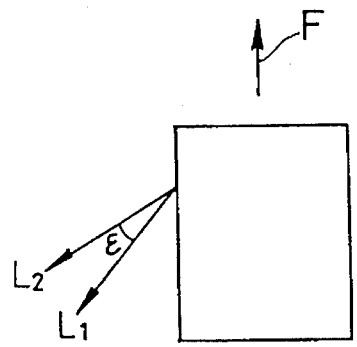

It should be noted that the directions of projection of the two light beams projected from the moving body 2 are not limited to those of the embodiment. For instance, the light beam $L_1$ may be projected in a direction inclined toward the rear side of the vehicle at an angle $\beta$ with respect to the laser beam $L_2$ which is projected in a perpendicular direction (FIG. 8(a)), or the two laser beams $L_1$ and $L_2$ may be projected at an angle $\gamma$ symmetrically about the perpendicular direction (FIG. 8(b)), or may be projected at an angle $\delta$ in the diagonally forward direction (FIG. 8(c)) or at an angle $\epsilon$ in the diagonally rearward direction (FIG. 8(d)).

Formulae (6) and (7) above for calculating the present position $Q_j$ of the moving body 2 are formulae which hold valid under the premise that the moving distance $a_j$ is linear, i.e., that the moving body 2 is traveling on a straight line or on a gentle curve. Under such a premise, the relative distance $a_j \cot \alpha$ with respect to the reflecting mirror $C_j$ is calculated, and the coordinate position $X_j, Y_j$ is calculated. It is true that if the moving body 2 is actually traveling straightly forward, the calculation error does not occur and no problem is presented. However, if the moving body 2 is making a turn in an orbiting manner, the premise that the moving body 2 is traveling straightly forward does not hold valid. Hence, errors which cannot be ignored are included in the calculated relative distance $a_j \cot \alpha$ and the calculated coordinate position $X_j, Y_j$. For this reason, the guided traveling along the predetermined traveling path is effected with a high degree of accuracy.

Accordingly, in an embodiment which will be described next, the relative distance and the position are calculated accurately by assuming a case where the moving body 2 makes a turn in an orbiting manner.

Figure 9:
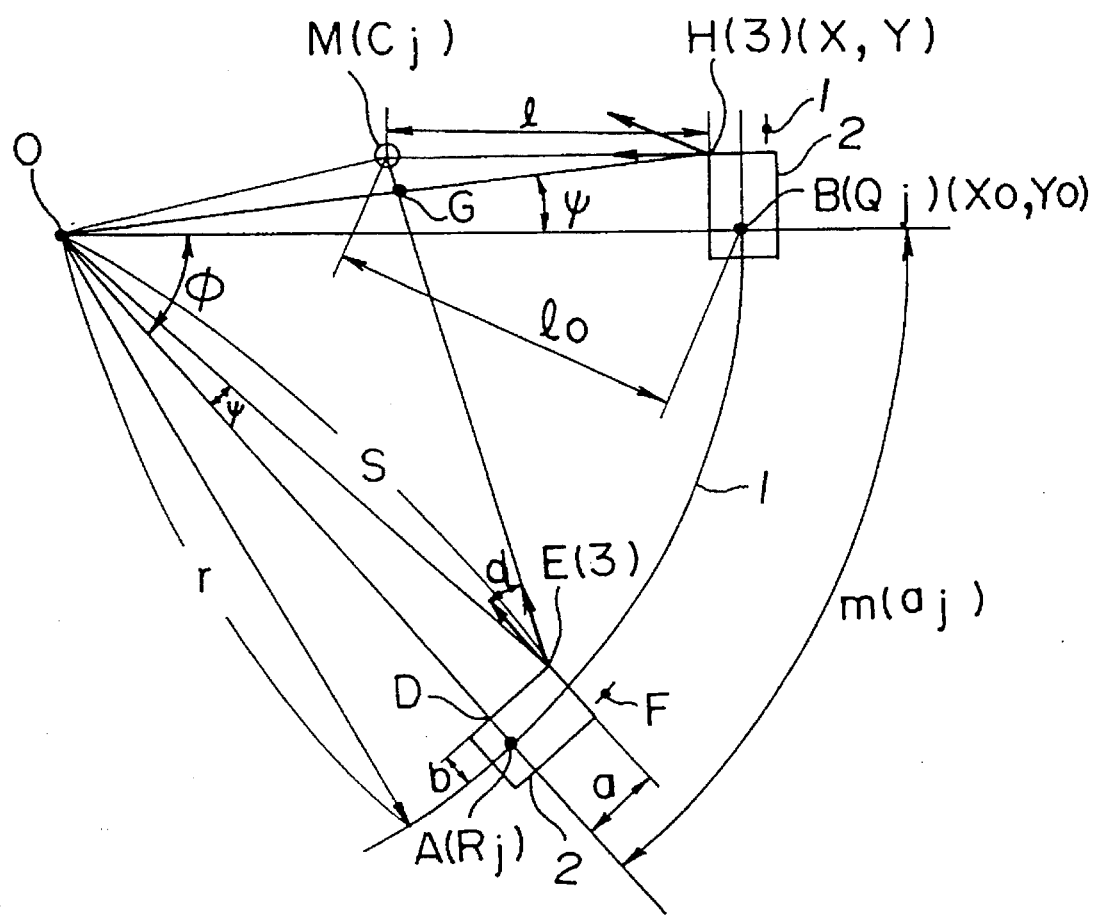
FIG. 9 is a diagram geometrically illustrating the manner in which the moving body makes a turn in an orbiting manner.

FIG. 9 is a diagram which shows geometric relations in a case where the moving body 2 travels between the two points $R_j$ and $Q_j$ in an orbiting manner along a circular arc 1 having a turning radius r (positive when turning to the left, and negative when turning to the right) with a point O as a center. It should be noted that although, in Formulae (6) and (7) above, the position 3 of installation of the light-beam projecting/receiving devices 8 and 9 is calculated as the position $X_j, Y_j$ of the moving body 2, the position $X_0, Y_0$ of the moving body 2 will be hereafter described as a central position between a left rear wheel and a right rear wheel of the moving body 2. This is attributable to the fact that the relevant central position in the moving body 2 is set as a measuring point in the measurement of the position.

In this case, it is assumed that the light-beam projecting/receiving devices 8 and 9 are disposed at a position spaced apart by a from the central position between the left and right rear wheels toward the front end of the moving body 2, and spaced apart by b toward the left-hand side of the moving body 2. Also, it is assumed that the position 3 of installation of the light-beam projecting/receiving devices 8 and 9 when the moving body 2 is located at a point A is a point E, and the position 3 of installation when the moving body 2 is located at a point B is a point H. Then, the distance between the central point O and the position of installation of the light-beam projecting/receiving devices 8 and 9 is assumed to be s.

Now, it is assumed that the moving body 2 has traveled in an orbiting manner on the circular arc 1 from the point A to the point B. It should be noted that the points A and B correspond to the points $R_j$ and $Q_j$ in FIG. 5.

Then, at the point A, a moving direction $\theta_A$ is obtained on the basis of an output of the rate gyro 4. Meanwhile, at the point B, a moving direction $\theta_B$ is obtained on the basis of an output of the rate gyro 4. Therefore, a turning angle $\phi$ (positive when turning to the left, and negative when turning to the right) of the moving body 2 between the points A and B is calculated as follows:

$$\phi = \theta_B - \theta_A \tag{16}$$

In addition, since the reflected light $L_2$ from the reflecting mirror $C_j$ installed at a point M is received by the light-beam projecting/receiving device 9 at the point A, and the reflected light $L_x$ from the reflecting mirror $C_j$ is received by the light-beam projecting/receiving device 8 at the point B, the length of the circular arc A–B, i.e., a moving distance m of the moving body 2 between the points A and B, is outputted from the counter 11. It should be noted that this moving distance m corresponds to the moving distance $a_j$ in FIG. 5.

Now, if it is assumed that an angle which is formed by a segment connecting the point O and the point E with respect to a segment connecting the point O and the point A is $\psi$, the following Formulae (17) and (18) hold with respect to a right-angled triangle ODE (here, D is a point on the segment OA on the left-hand side of the moving body 2):

$$s \cdot \cos \psi = r - b \tag{17}$$

$$s \cdot \sin \psi = a \tag{18}$$

In addition, the following Formula (19) holds with respect to a sector OAB:

$$r = m/\phi \tag{19}$$

Next, the following Formula (20) holds with respect to a triangle OEG:

$$OG/\sin(\alpha+\psi) = s/\sin\{\pi-(\alpha+\phi+\psi)\} \tag{20}$$

In addition, if it is assumed that the distance between M and H, i.e., the relative distance between the reflecting mirror $C_j$ and the light-beam projecting/receiving devices 8 and 9 at the second light receiving point B, is 1, the following Formula (21) holds with respect to a triangle MGH:

$$1/\sin\{\pi-(\alpha+\phi+\psi)\} = (s-OG)/\sin(\alpha+\phi) \tag{21}$$

If the relative distance 1 is determined from Formulae (17) to (21) above, we have $$l = \{1/\sin(\alpha+\phi)\} [(r-b)\{\sin(\alpha+\phi)-\sin\alpha\} + a\{\cos(\alpha+\phi)-\cos\alpha\}] \tag{22}$$

Here, it can be assumed that the turning angle $\phi$ is infinitesimal, in which case approximations can be obtained such that $\cos \phi = 1$, and $\sin \phi = 0$, so that Formula (22) is rewritten as $$l = \{1/\sin\alpha + \phi \cdot \sin\alpha)\} \cdot \{m\cos\alpha - \phi (a \cdot \sin\alpha + b \cdot \cos\alpha)\} \tag{23}$$

Incidentally, in a case where the moving body 2 moves straight forwardly between the two points A and B, the turning angle $\phi=0$ is substituted for Formula (23), and we have $$l = m/\tan\alpha \tag{23}$$

Meanwhile, a relative distance $l_1$ between the point M of installation of the reflecting mirror $C_j$ and the second light receiving point B is $$l_0 = \sqrt{\{(l+b)^2 + a^2\}} \tag{24}$$

Accordingly, by substituting the measured turning angle $\phi$ (Formula (16)) and the measured moving distance m for Formula (23), the relative distance l of the moving body 2 is determined. By substituting the relative distance l thus obtained for Formula (24), it is possible to determine the relative distance $l_0$ of the second light receiving point B of the moving body 2 with respect to the position M of installation of the reflecting mirror $C_j$. In addition, the coordinate position $(X_0, Y_0)$ at the point B can be determined by the following Formulae (25) and (26) by using $l_0$ instead of $a_j \cdot \cot \alpha$ in Formulae (6) and (7) above:

$$X_0 = X_{cj} + l_o \cdot \sin(\theta_B - \psi) \tag{25}$$

$$Y_0 = Y_{cj} - l_0 \cdot \cos(\theta_B - \psi) \tag{26}$$

It should be noted that $X_{cj}$ and $Y_{cj}$ represent the coordinate position of the reflecting mirror $C_j$.

Also, a calculation can be made by assuming that the position of the moving body 2 is at the position of installation of the light-beam projecting/receiving devices 8 and 9. In this case, the relative distance l of the moving body 2 with respect to the reflecting mirror $C_j$ can be determined in accordance with Formula (23), and the coordinate position X, Y of the moving body 2 can be determined in accordance with the following Formulae (27) and (28):

$$X = X_{cj} + l \cdot \sin \theta_B \tag{27}$$

$$Y = Y_{cj} - l \cdot \cos \theta_B \tag{28}$$

The CPU 7 outputs a steering angle command for causing the moving body 2 to travel along the predetermined traveling path to the steering driving unit on the basis of the corrected position $X_0, Y_0$ (or X, Y) thus calculated, so as to control the driving of the steering wheels of the moving body 2. In this case, the relative distance is accurately calculated by assuming the time when the moving body 2 travels in an orbiting manner, and the position of the moving body 2 is calculated accurately, so that the traveling along the predetermined traveling path is guided with a high degree of accuracy.

It should be noted that although, in the above-described embodiment, a calculation is made by assuming that the relative distance and position of the moving body 2 are the relative distance and position at the second light receiving point B, the relative distance and position at the first light receiving point A may alternatively be calculated.

Although, in the above-described embodiment, a description has been given of a case where the present invention is applied to corrective calculation in the dead reckoning, the present invention is not confined to the same. In other words, the present invention is applicable to an arbitrary apparatus insofar as the apparatus measures the relative distance or position of a moving body with respect to a mark of the moving body, and guides the traveling of the moving body on the basis of the result of this measurement. For example, the present invention is applicable to a case where the relative distance or position of the moving body is calculated, the relative distance or position is displayed on a display screen, and the traveling of the moving body is controlled manually by an operator on the basis of the displayed content.

Although, in the above-described embodiment, a description has been given of a case where the moving body travels in an orbiting manner along a circular arc between the light receiving points A and B, in a case where the radius of curvature of the traveling locus of the moving body is not small, and the distance between the mark and the moving body is not large, sufficient approximation is possible even if a curve whose traveling locus is not strictly an circular arc is assumed to be a circular arc, as shown in the embodiment.

As described above, in accordance with the present invention, since the corrected position and direction of the moving body can be obtained accurately and reliably, the moving body can be guided along a predetermined traveling path with a high degree of accuracy, and the reliability of the apparatus can be improved.

In addition, even in a case where the moving body is traveling in an orbiting manner, since the relative distance or the position of the moving body with respect to a mark can be calculated accurately, the guided traveling can be controlled with a high degree of accuracy on the basis of the results of the calculation.

What is claimed is:

1. An apparatus for controlling the position of a moving body, which includes moving-distance detecting means for detecting a moving distance of the moving body, traveling-direction detecting means for detecting a traveling direction of the moving body, and calculating means for calculating an estimated position and the traveling direction of the moving body on the basis of an output of the traveling-direction detecting means, so as to intermittently correct the calculated position and traveling direction of the moving body and to control the traveling of the moving body along a predetermined iterative traveling path on the basis of the corrected position and traveling direction, said apparatus comprising:

light projecting means disposed on the moving body, for projecting a first light beam and a second light beam in a lateral direction;

light reflecting means disposed at intervals on one side of the predetermined traveling path of the moving body, for reflecting the first light beam and the second light beam projected by said light projecting means;

light receiving means disposed on the moving body, for receiving the first light beam and the second light beam reflected by said reflecting means;

corrected-position calculating means for determining the position of the moving body from a time when one of the first light beam and the second light beam is received by said light receiving means until the other thereof is received on the basis of an output of said light receiving means and an output of said moving-distance detecting means, and for calculating the corrected position of the moving body on the basis of data consisting of said moving distance, a position of installation of said light reflecting means, angles of projection of the first light beam and the second light beam, and the traveling direction estimated by said calculating means and storing said data;

corrected-traveling-direction calculating means for determining an error in the traveling direction calculated by said calculating means on the basis of a value calculated by said corrected-position calculating means, the position calculated by said calculating means and said stored data, for calculating a corrected traveling direction of the moving body on the basis of said error and the traveling direction calculated by said calculating means, whereby said apparatus controls the moving body for travel along the predetermined traveling path on the basis of outputs of said corrected-position calculating means and said corrected-traveling-direction calculating means.

2. An apparatus for controlling the travel of a moving body, which includes moving-distance detecting means for detecting a moving distance of the moving body, traveling-direction detecting means for detecting a traveling direction of the moving body, and calculating means for calculating an estimated position and the traveling direction of the moving body on the basis of an output of the traveling-direction detecting means, so as to intermittently correct the calculated position and traveling direction of the moving body and to control the traveling of the moving body so that the moving body travels along a predetermined iterated traveling path programmed in advance in the moving body, on the basis of the corrected position and traveling direction, said apparatus comprising:

light projecting means disposed on the moving body, for projecting a first light beam and a second light beam in a lateral direction;

light reflecting means disposed at intervals on one side of the predetermined traveling path of the moving body, for reflecting the first light beam and the second light beam projected by said light projecting means;

light receiving means disposed on the moving body, for receiving the first light beam and the second light beam reflected by said reflecting means;

corrected-position calculating means for determining the position of the moving body from a time when one of the first light beam and the second light beam is received by said light receiving means until the other thereof is received on the basis of an output of said light receiving means and an output of said moving-distance detecting means, and for calculating the corrected position of the moving body on the basis of data consisting of said moving distance, a position of installation of said light reflecting means, angles of projection of the first light beam and the second light beam, and the traveling direction estimated by said calculating means;

light-reflecting-means-position calculating means for determining the position of the moving body from the time when one of the first light beam and the second light beam is received by said light receiving means until the other thereof is received on the basis of first data consisting of to the output of said light receiving means and the output of said moving-distance detecting means, and for calculating a position of installation of said light reflecting means on the basis of second data consisting of said moving distance, angles of projection of the first light beam and the second light beam, and the position and traveling direction estimated by said calculating means storing said first and second data;

corrected-traveling-direction calculating means for determining an error in the traveling direction calculated by said calculating means on the basis of a value calculated by said corrected-position calculating means, said first and second stored data and the position of the moving body calculated by said calculating means, and for calculating a corrected traveling direction of the moving body on the basis of said error and the traveling direction estimated by said calculating means, programming the traveling body to travel along a predetermined path;

wherein at the time of programming the moving body travels along the predetermined path, the resultant position calculated by said calculating means is set as a predetermined passing point, and the position of installation of said light reflecting means is detected in advance by said light-reflecting-means-position calculating means, and wherein when the moving body begins to travel along the predetermined traveling path the detected position of installation of said light reflecting means is set as data to be used by said corrected-position calculating means, whereby said apparatus controls the traveling of the moving body on the basis of outputs of said corrected-position calculating means and said corrected-traveling-direction calculating means so that the moving body travels the taught predetermined passing point.

3. An apparatus for measuring the position of a moving body according to claim 2, wherein the predetermined traveling path is a traveling path of a closed loop, wherein at the time of said programming, the predetermined traveling path positions of installation of two light reflecting means in a vicinity of a starting point of the predetermined traveling path and the positions of installation of said two light reflecting means at a time when the moving body returns to the starting point after making a circuit along the predetermined traveling path are respectively detected by a light-reflecting-means-position detecting means, and deviations of the position and the traveling direction at a time when the moving body makes a circuit of the predetermined traveling path are calculated on the basis of a result of the detection and the position calculated by said calculating means when the moving body returns to the starting point after making the circuit, and wherein when the moving body begins to travel along the predetermined traveling path the position and traveling direction of the moving body are corrected on the basis of the calculated deviations each time the moving body passes the starting point.

4. An apparatus for measuring the traveled by a moving body so as to guide the traveling of the moving body along a predetermined traveling path on the basis of the measurement of the relative distance of the moving body with respect to a mark, said apparatus comprising: moving-distance detecting means for detecting a moving distance of the moving body;

a turning-angle detecting means for detecting a turning angle of the moving body;

light projecting means disposed on the moving body, for projecting a first light beam and a second light beam in a lateral direction;

light reflecting means disposed on one side of the predetermined moving path of the moving body and serving as the mark for reflecting the first light beam and the second light beam;

light receiving means disposed on the moving body, for receiving the first light beam and the second light beam reflected by said light reflecting means; and relative-distance calculating means for determining the position of the moving body from a time one of the first light beam and the second light beam is received until the other thereof is received, on the basis of an output of said light receiving means and an output of said moving-distance detecting means, for determining the turning angle of the moving body from the time one of the first light beam and the second light beam is received until the other thereof is received, on the basis of the output of said light receiving means and the output of said turning-angle detecting means, and for calculating the relative position of the moving body with respect to said light reflecting means at the point of time when one of the first light beam and the second light beam is received by said light receiving means, on the basis of data consisting of the moving distance and the turning angle thus determined, the position of installation of said light reflecting means, and angles of projection of the first light beam and the second light beam.

5. An apparatus for measuring a position of a moving body so as to guide the traveling of the moving body along a predetermined traveling path on the basis of a result of measurement of the position of the moving body, said apparatus comprising:

moving-distance detecting means for detecting a moving distance of the moving body;

moving-direction detecting means for detecting a moving direction of the moving body;

light projecting means disposed on the moving body, for projecting a first light beam and a second light beam in a lateral direction;

light reflecting means disposed on one side of the predetermined moving path of the moving body, for reflecting the first light beam and the second light beam;

light receiving means disposed on the moving body, for receiving the first light beam and the second light beam reflected by said light reflecting means; and relative-distance calculating means for determining the moving distance of the moving body from a time one of the first light beam and the second light beam is received until the other thereof is received, on the basis of an output of said light receiving means and an output of said moving-distance detecting means, for determining a turning angle of the moving body from the time one of the first light beam and the second light beam is received until the other thereof is received, on the basis of the output of said light receiving means and the output of said moving-direction detecting means, and for calculating the relative position of the moving body with respect to said light reflecting means at the point of time when one of the first light beam and the second light beam is received by said light receiving means, on the basis of data consisting of the moving distance and the turning angle thus determined, the position of installation of said light reflecting means, angles of projection of the first light beam and the second light beam, and the moving direction detected by said moving-direction detecting means.

6. An apparatus for controlling the travel of a moving body along, which includes moving-distance detecting means for detecting a moving distance of the moving body, traveling-direction detecting means for detecting a traveling direction of the moving body, and calculating means for calculating an estimated position and the traveling direction of the moving body on the basis of an output of the traveling-direction detecting means, so as to intermittently correct the calculated position and traveling direction of the moving body and to control the traveling of the moving body so that the moving body travels along a predetermined iterated traveling path programmed in advance in the moving body, on the basis of the corrected position and traveling direction, said apparatus comprising:

light projecting means disposed on the moving body, for projecting a first light beam and a second light beam in a lateral direction;

light reflecting means disposed at intervals on one side of the predetermined traveling path of the moving body, for reflecting the first light beam and the second light beam projected by said light projecting means;

light receiving means disposed on the moving body, for receiving the first light beam and the second light beam reflected by said reflecting means;

corrected-position calculating means for determining the location of the moving body from a time when one of the first light beam and the second light beam is received by said light receiving means until the other thereof is received on the basis of an output of said light receiving means and an output of said moving-distance detecting means, and for calculating the corrected position of the moving body on the basis consisting of said moving distance, a position of installation of said light reflecting means, angles of projection of the first light beam and the second light beam, and the traveling direction estimated by said calculating means;

light-reflecting-means-position calculating means for determining the position of the moving body from the time when one of the first light beam and the second light beam is received by said light receiving means until the other thereof is received on the basis of first data consisting of the output of said light receiving means and the output of said moving-distance detecting means, and for calculating a position of installation of said light reflecting means on the basis of second data related to said moving distance, angles of projection of the first light beam and the second light beam, and the position and traveling direction estimated by said calculating means storing said first and second data;

corrected-traveling-direction calculating means for determining an error in the traveling direction calculated by said calculating means on the basis of a value calculated by said corrected-position calculating means, said first and second stored data and the position of the moving body calculated by said calculating means, and for calculating a corrected traveling direction of the moving body on the basis of said error and the traveling direction estimated by said calculating means, programming the traveling body to travel along a predetermined path wherein the predetermined traveling path is a traveling path of a closed loop, wherein at the time of said programming, the predetermined traveling path positions of installation of two light reflecting means in a vicinity of a starting point of the predetermined traveling path and the positions of installation of said two light reflecting means at a time when the moving body returns to the starting point after making a circuit along the predetermined traveling path are respectively detected by a light-reflecting-means-position detecting means, and deviations of the position and the traveling direction at a time when the moving body makes a circuit of the predetermined traveling path are calculated on the basis of a result of the detection and the position calculated by said calculating means when the moving body returns to the starting point after making the circuit, and wherein when the moving body begins to travel along the predetermined traveling path the position and traveling direction of the moving body are corrected on the basis of the calculated deviations each time the moving body passes the starting point.

* * * * *